B. A. PETERSON.
DOFFER.
APPLICATION FILED DEC. 3, 1910.

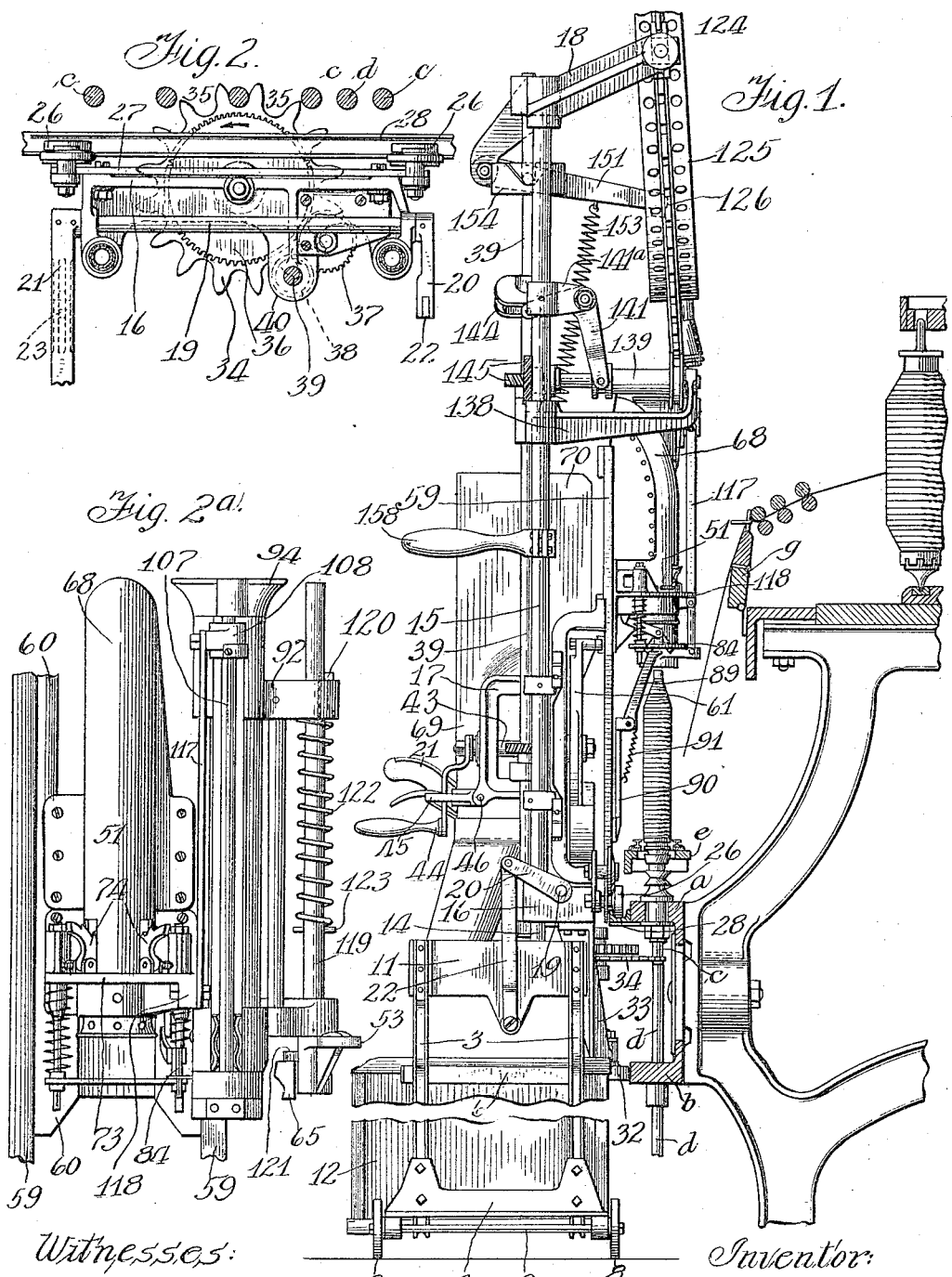

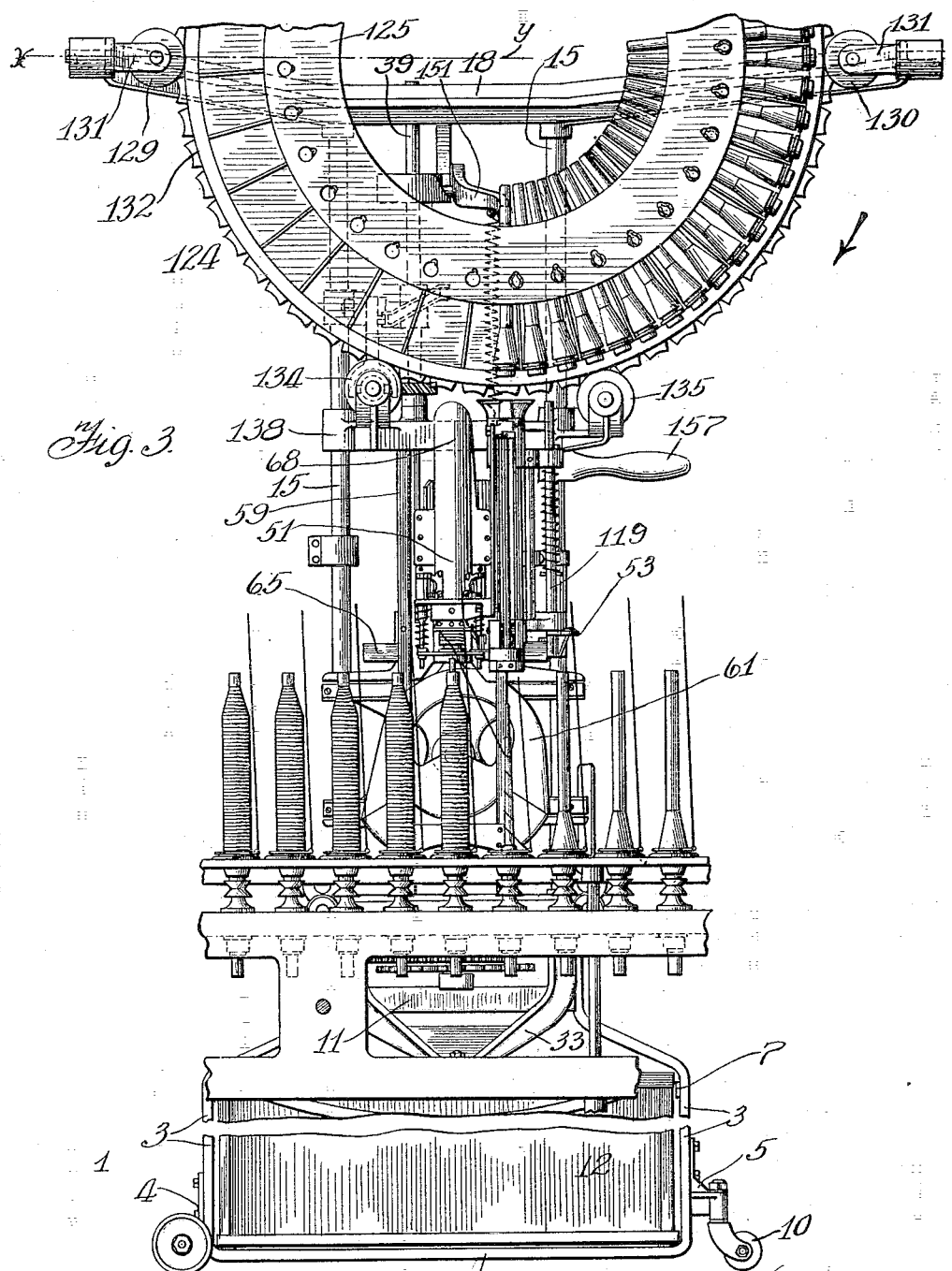

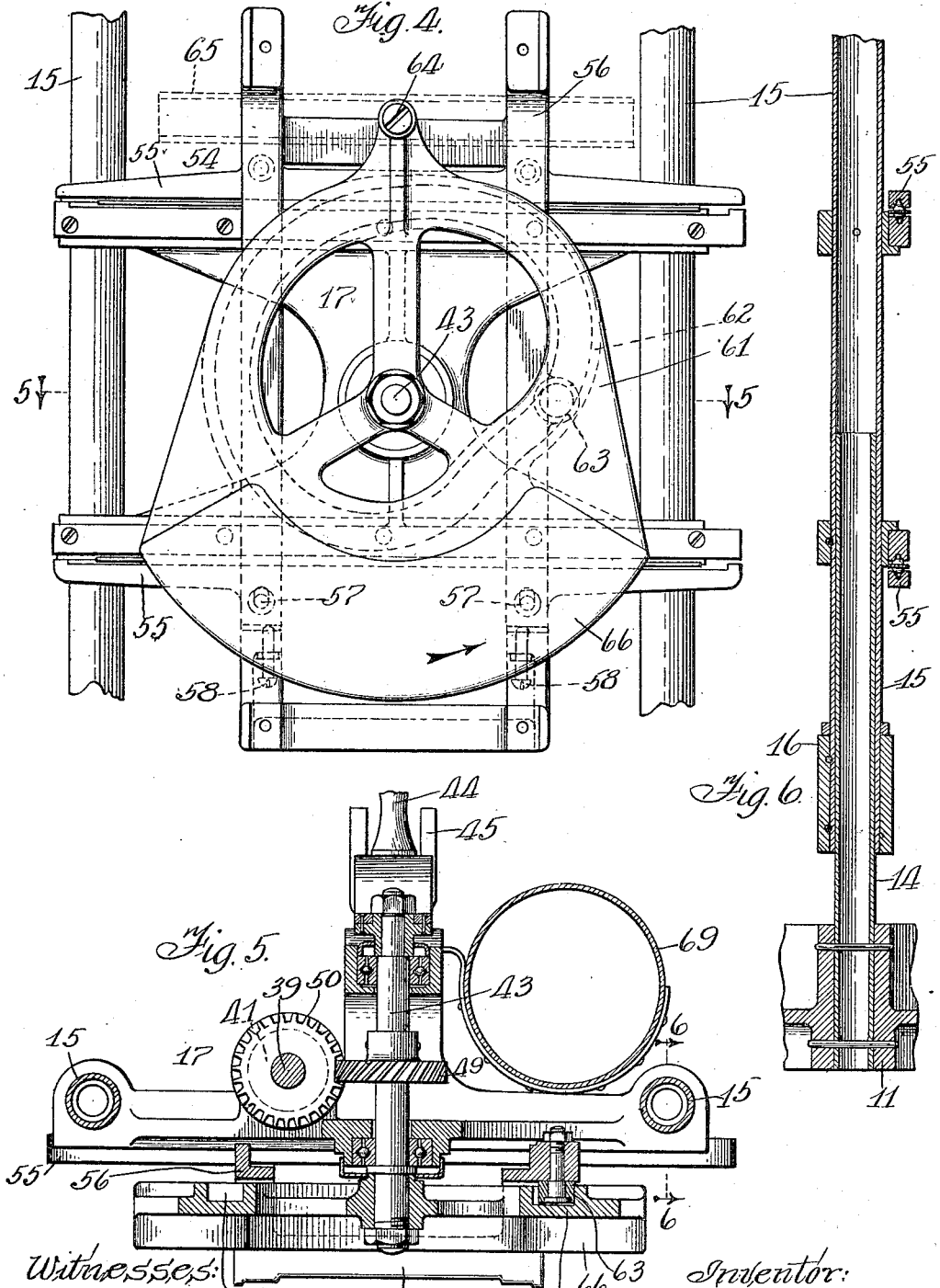

1,127,674.

Patented Feb. 9, 1915.

7 SHEETS—SHEET 4.

Witnesses:
J. C. Devick.
George L. Chindahl

Inventor:
Burt A. Peterson,
By Luther L. Miller
Atty.

THE NORRIS PETERS CO., PHOTO-LITHO., WASHINGTON, D. C.

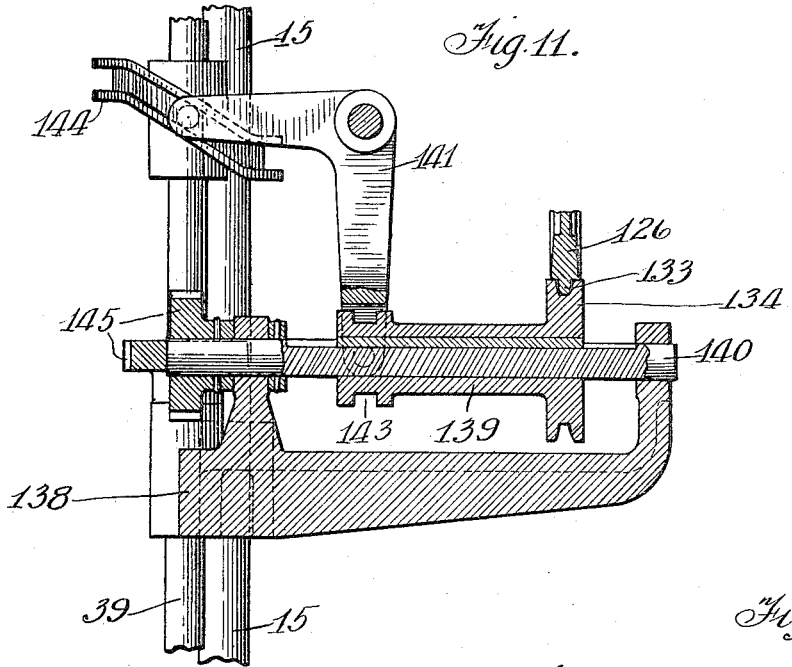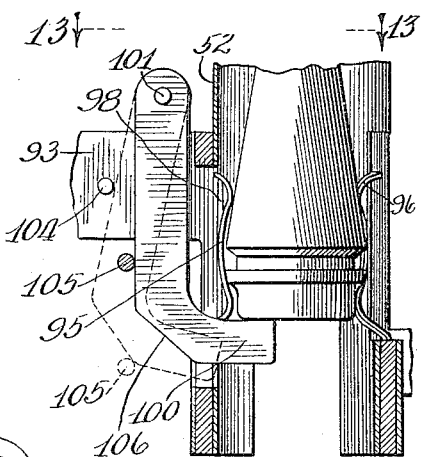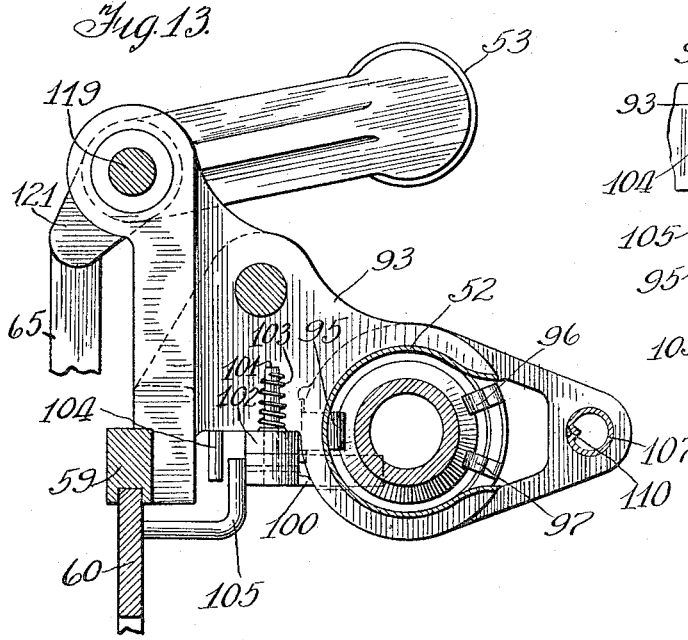

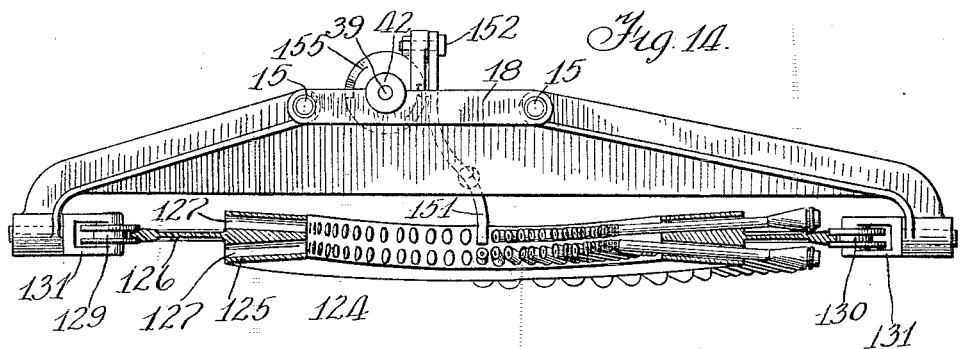
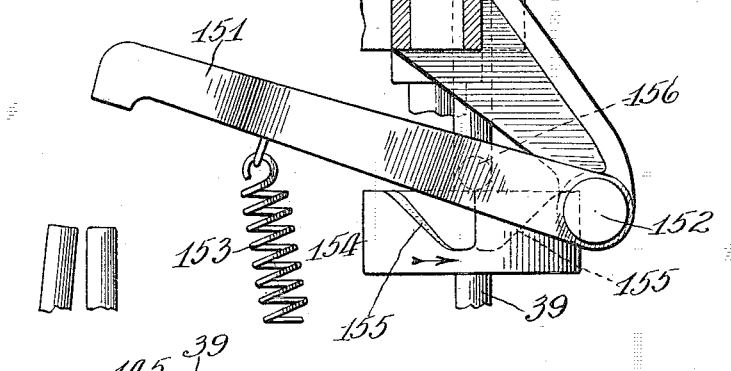
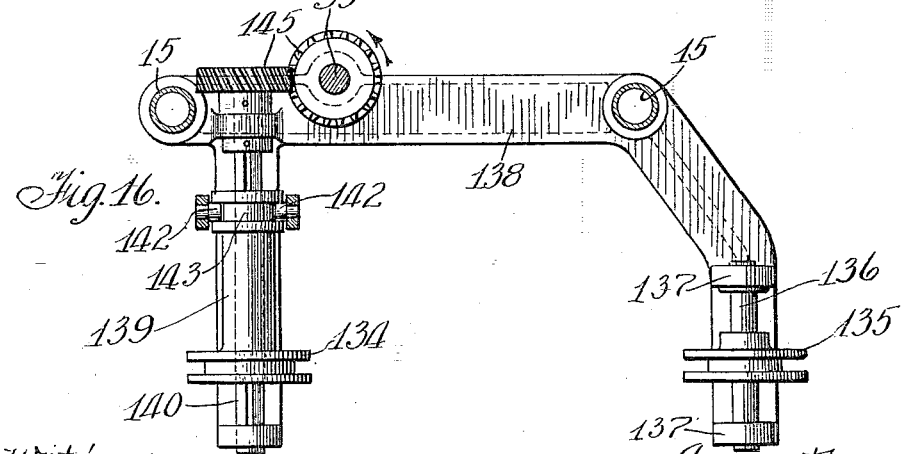

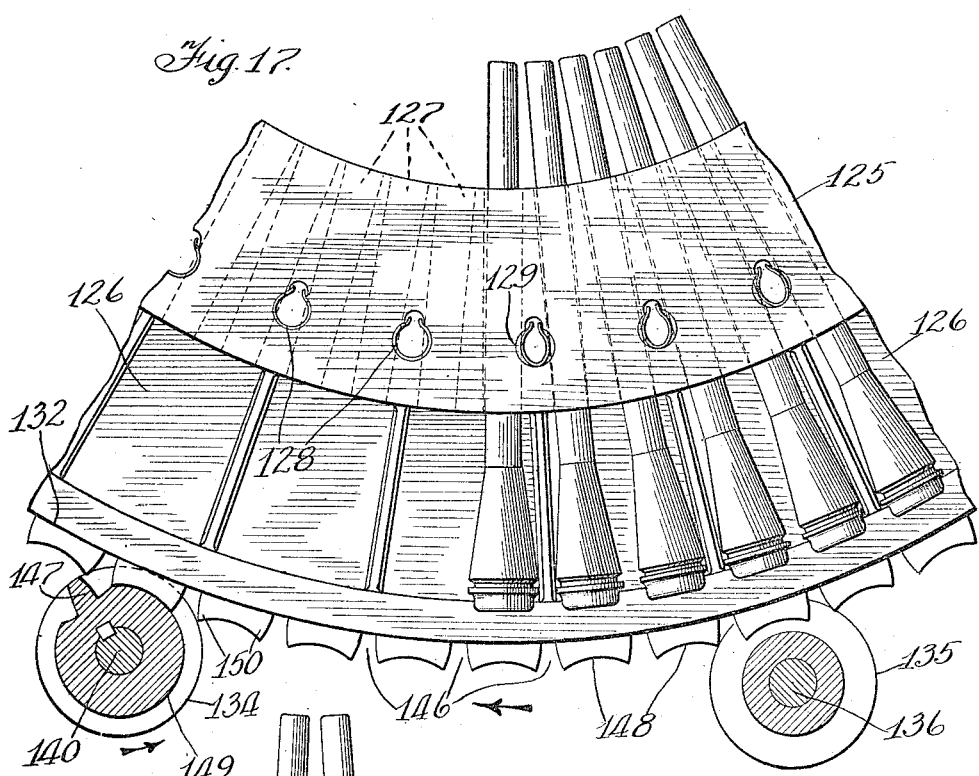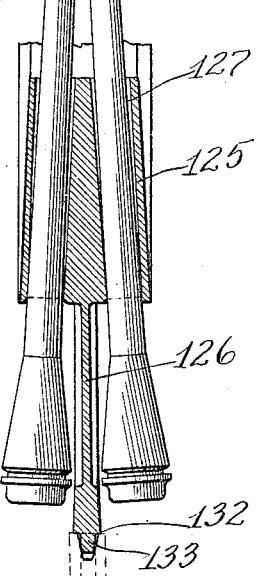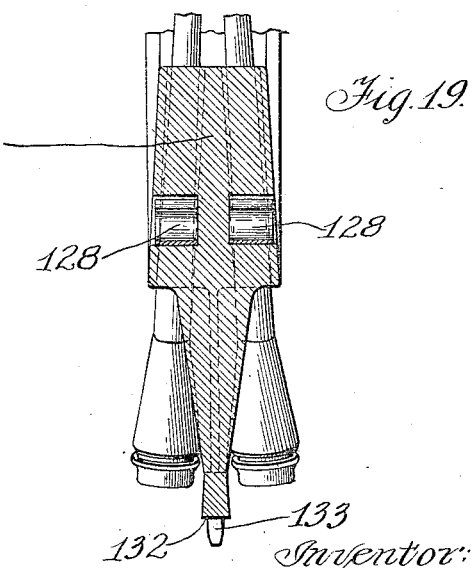

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFER.

1,127,674.  Specification of Letters Patent.  Patented Feb. 9, 1915.

Application filed December 3, 1910. Serial No. 595,414.

*To all whom it may concern:*

Be it known that I, BURT A. PETERSON, a citizen of the United States, residing at Rockford, in the county of Winnebago and State of Illinois, have invented certain new and useful Improvements in Doffers, of which the following is a specification.

This invention relates to means for replacing full bobbins upon a spinning frame with empty bobbins, a process which is termed "doffing."

The invention is herein represented as embodied in a doffer of the portable type, *i. e.*, a machine adapted to travel along the front of a spinning frame and doff the bobbins successively.

The present invention relates particularly to a bobbin magazine for traveling doffers and to a means for discharging bobbins successively from the magazine as the doffing progresses.

The invention also refers to the donning means which receives the bobbins from the magazine and places them upon the spindles of the spinning frame.

Figure 8:
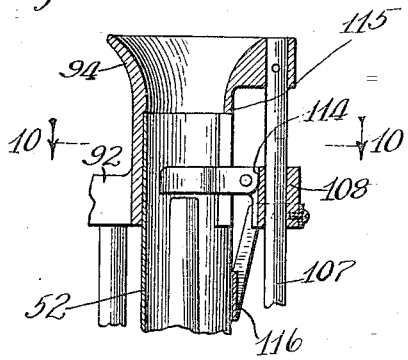
Figure 7:
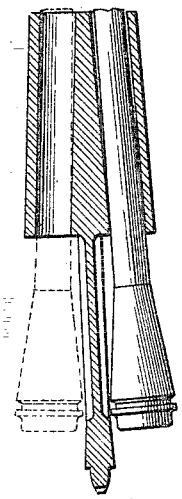
Figure 9:
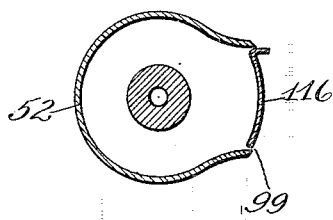
Figure 10:
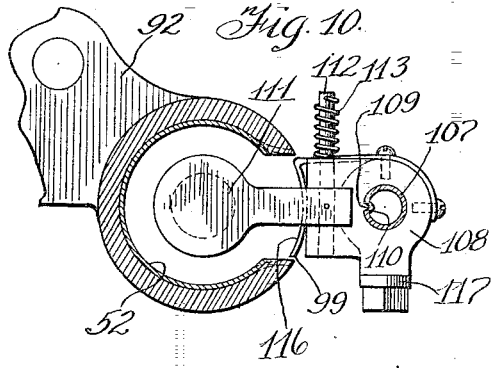

In the accompanying drawings, Figure 1 is a side elevation of one form of doffer embodying my invention, the doffer being shown in operative relation to a spinning frame. Fig. 2 is a horizontal section illustrating the timing and actuating wheel in top plan. Fig. 2ª is a fragmental rear elevation of the doffer, showing the doffing, donning and bobbin-seating devices. Fig. 3 is a rear elevation of the doffer, with parts broken away, together with a portion of the spinning frame. Fig. 4 is a rear view of a portion of the actuating mechanism. Fig. 5 is a sectional view taken in the plane of dotted line 5—5 of Fig. 4. Fig. 6 is a section on line 6—6 of Fig. 5. Fig. 7 is a sectional view of the donning or bobbin-supply tube and related devices, together with a portion of the magazine. Fig. 8 is a view of the upper end of the donning tube. Fig. 9 is a horizontal section through the donning tube and a guard device coöperating therewith. Fig. 10 is a section on line 10—10 of Fig. 8. Fig. 11 is a view of the means for swinging and rotating the magazine. Fig. 12 is a sectional view of the lower end of the donning tube. Fig. 13 is a section on line 13—13 of Fig. 12. Fig. 14 is a view showing the upper frame member of the doffer in plan and the magazine in horizontal central section. Fig. 15 illustrates a means for discharging bobbins from the magazine. Fig. 16 represents a portion of the magazine-supporting means and the means for rotating and swinging the magazine. Fig. 17 is a fragmental view of the magazine and its supporting and rotating means. Figs. 18 and 19 are fragmental sectional views of the magazine.

In the present embodiment of the invention, the operating mechanism, the magazine for empty bobbins, and the receptacle for full bobbins are mounted upon a framework or carriage adapted to be moved along the sides of a spinning frame and also adapted to be rolled about the mill. The carriage consists of two sections, the lower one of which supports the full-bobbin receptacle and is arranged to travel upon the floor, while the upper section carries the operating mechanisms and the empty-bobbin magazine, and is adapted to be supported upon the spinning frame when in use and at other times upon the lower section.

The lower carriage-section 1 is herein shown, by way of example, as comprising two bars bent to form the bottom portions 2 and the side portions 3. Said bars are united by cross-pieces 4, 5, 6 and 7. Two carrying rollers 8 are mounted upon the axle 9 arranged in bearings on the cross-piece 4, and two casters 10 are attached to the cross-piece 5. The upper ends of the side bars 3 are rigidly secured to a frame member 11. The full-bobbin receptacle 12 may be of any suitable form and construction. As herein shown, it is adapted to be placed in the open frame formed by the parts 2, 3, 4, 5, 6 and 7, and rest upon the bottom members of said frame.

The upper carriage-section is connected to the lower section for movement relative thereto in a suitable way. Herein I have shown two upright columns 14 (Figs. 1 and 6) fixed to the frame member 11, upon which columns the upper carriage-section is mounted for vertical movement. In this instance the upper carriage-section consists of two tubes 15 slidably surrounding the columns 14, a bottom cross-piece 16, a middle cross-piece or bracket 17 (Fig. 5) and a top bracket 18 (Figs. 3 and 14), said cross-pieces being rigidly fixed to the tubes 15.

The means herein shown for raising and lowering the upper carriage-section consists of a rock shaft 19 (Fig. 2) mounted in the bottom cross-piece 16, two arms 20 21 fixed on the ends of said shaft, and links 22 23 connecting said arms to the frame member 11 of the lower carriage-section. The arm 21 is of sufficient length to serve as a hand lever in raising and lowering the upper section. If desired, any common or preferred means may be provided for locking the carriage-sections against movement with relation to each other.

In the present embodiment, the upper carriage-section is arranged to be supported upon the spinning frame by means of two grooved rollers 26 (Figs. 1 and 2) mounted upon the ends of a bar 27 fixed to the bottom cross-piece 16. These rollers run on a channel-bar rail 28 attached to the spinning frame in any suitable manner adjacent to the forward edge of the spindle rail $a$.

32 is a roller carried by a bracket 33 fixed to the bottom cross-piece 16 and bearing against the lower flange $b$ of the spindle rail.

The timing and feeding mechanism that moves the doffer along the spinning frame and keeps it in step with the spindles comprises a star wheel or gear wheel 34 (Figs. 1 and 2) rotatably mounted in a horizontal position upon the lower side of the bottom cross-piece 16 in position to engage the spindle bases $c$, said bases constituting a rack with which the toothed wheel 34 engages. Said wheel may have double teeth, or, in other words, the ends of the teeth may be concave, as at 35, to clear the rods $d$ (Figs. 1 and 2) that carry the ring rail $e$.

Fixed with relation to the star wheel 34 is a gear wheel 36 meshing with an intermediate gear 37 that meshes with a pinion 38 rigidly mounted on the lower end of a vertical shaft 39. This shaft is supported in bearings 40 41 42 on the transverse frame members 16 17 18, respectively, (Figs. 2, 5 and 14). In this instance the shaft 39 is arranged to be driven manually through a shaft 43 (Fig. 5) mounted in the bracket 17, the forward end of said shaft bearing a hand crank 44. When the machine is not in use, the mechanism may be locked against operation by suitable means such as a fork 45 (Figs. 2 and 5) adapted to embrace the crank and pivoted on a cross-pin 46 on the bracket 17. On the shaft 43 is a spiral gear wheel 49 meshing with a similar gear wheel 50 on the vertical shaft 39.

The upper carriage-section supports a doffing tube 51, a donning or bobbin-supply tube 52, and a bobbin-seater 53 (Figs. 2, 3 and 7), said tubes and bobbin-seater being arranged side by side, the distance between the centers of said tubes, as well as the distance between the center of the donning tube and the operative portion of the bobbin-seater, being equal to the distance between the centers of adjacent spindles.

In operation, the doffer has a continuous movement along the spinning frame, while the doffing tube has an intermittent movement along said frame, said tube moving downward over a filled bobbin and rising with said bobbin during each pause between the steps of its progressive movement along the spinning frame. The donning tube also moves intermittently along the spinning frame, pausing above each spindle while a bobbin is being ejected from the tube onto said spindle. The movements of the bobbin-seater are similar to those of the doffing tube. To obtain these various movements, I have provided mechanism which is herein shown as comprising a slide frame 54 (Fig. 4) consisting of two slides 55 secured to a frame 56. In the opposing faces of the slides 55 are formed ball races complementary to ball races on the bracket 17, a series of balls being provided in each pair of races. The lower slide 55 is secured to the frame 56 by screws 57 extending through elongated openings in said slide. Adjusting screws 58 seated in the frame 56 bear at their upper ends against the lower slide 55, and thus constitute means for adjusting the ball bearings for the slide frame 54. Fixed to the frame 56 are two vertical grooved guide bars 59 (Figs. 1 and 13) in which is mounted a slide 60, to which slide the doffing tube 51 is attached. The donning tube 52 and the bobbin-seater 53 are attached to the horizontally-reciprocated slide frame 54.

The means herein shown for reciprocating the slide frame 54 horizontally with relation to the carriage, and for vertically reciprocating the slide 60 with relation to the slide frame 54 comprises a cam disk or wheel 61 (Figs. 1, 3, 4 and 5) secured to the rear end of the shaft 43. In one face of said wheel is a cam groove 62 to receive a roller stud 63 carried by the slide frame 54; and upon its opposite face is a roller stud 64 fitting in a channel bar 65 secured to the slide 60. The weight of the slide 60 and the parts carried thereby is counterbalanced by the weight-portion 66 of the cam wheel. The contour of the cam groove 62 is such that the slide frame 54 is stationary with reference to the spinning frame while a filled bobbin is being removed, and is then given a quick forward movement to place the doffing tube, the donning tube and the bobbin-seater in register with succeeding spindles.

Associated with the lower end of the tube 51 is bobbin-engaging means of any suitable character, as for example that fully illustrated and described in British Patent No. 23,642 of 1909. I have deemed it unnecessary to illustrate the bobbin-engaging means in detail herein; however, a general view of said engaging means is contained in Fig. 2ª, 73 being a bracket fixed to the slide 60, to which bracket the lower end of the tube 51 is secured, and 74 being gripping dogs pivoted on said bracket and extending through slots in said tube into position to engage the yarn on a filled bobbin. The upper end of the doffing tube merges into a curved guide portion 68 having an open forward side. Fixed in the upper carriage-section is a tube 69, the entrance end of which comprises guide walls 70 extending close to the plane of horizontal reciprocation of the slide 60.

A shear 84 (Fig. 1) is associated with the lower end of the doffing tube 51 and arranged to sever the thread running from a doffed bobbin to the devices upon the spinning frame. Said shear may be of any suitable character, as for example, that fully disclosed in said British patent.

In use, the doffing tube 51 is moved downwardly over a filled bobbin, and upon the next upward movement of the tube the bobbin, being held by the bobbin-engaging means, is pulled from the spindle. On the next downward movement of the tube 51, this bobbin is held from downward movement with the tube by means of a finger 89 (Fig. 1) pivoted on a bracket 90 fixed to the guides 59. A coiled spring 91 tends to hold the finger 89 in the path of the bobbins, but permits the finger to yield to allow the bobbin to pass upwardly. In the downward movement of the tube the bobbin is stopped by the finger 89, and as the tube continues its descent the curved guide portion 68 tips the bobbin forwardly into the tube 69, through which it drops into the box 12.

The donning or bobbin-supply tube 52 is secured to the slide frame 54 so as to reciprocate horizontally with said frame, by brackets 92 93 (Fig. 7). The upper end of said tube is provided with a flaring inlet 94. Mounted in operative relation to the lower end of the tube is means for yieldingly closing the tube against the exit of bobbins, which means may comprise three spring fingers 95 96 97. The finger 95 projects through a slot 98 in one side of the tube 52. In the opposite side of the tube is a slot 99 which is continued through the adjacent portions of the brackets 92 93, the fingers 96 97 projecting through the lower part of said slot. The spring fingers 95 96 97 are adapted to releasably support the butt of a bobbin discharged into the tube 52 from the magazine to be later described, but if desired additional means may be employed to arrest the descent of the bobbin. One form of device for this purpose is shown in Fig. 12, and consists of a dog 100 having fixed thereto a pivot pin 101 mounted in a bearing 102 carried by the bracket 93. A tension spring 103 fixed at one end to said pivot pin and at its other end to said bearing tends to swing the dog 100 out of the donning tube and into the position indicated in dotted lines in Fig. 12.

104 is a stop to limit the withdrawing movement of the dog. The latter is moved into operative position in time to arrest the descending bobbin by suitable means, as, for example, a finger 105 carried by the slide 60 and adapted to engage the wedging surface 106 on the dog on the up-stroke of said slide. During the early part of the downward movement of the slide the finger 105 releases the dog 100 which immediately withdraws from the tube and leaves the bobbin supported by yielding devices 95 96 97 so that the bobbin-ejecting means may discharge the bobbin from the tube 52 onto the bare spindle over which said tube is positioned.

The bobbin-ejecting means referred to may be of any suitable character, as, for example, that illustrated in Figs. 7, 8 and 10. In said views, 107 is a guide fixed to the inlet 94 and the bracket 93 in parallel relation to the bobbin-supply tube 52. A sleeve 108 is slidably mounted upon said guide, being held against turning by a rib 109 fitting into a groove 110 in the guide. An ejector-finger 111 has fixed thereto a pivot 112 which is mounted on the sleeve 108, said finger being arranged to be swung through the slot 99 into position to overlie a bobbin detained by the devices 95 96 97, by a torsion spring 113 (Fig. 10) secured at one end to the pivot pin 112 and at its other end to the sleeve 108, said spring tending to hold the finger 111 in operative position with its stop shoulder 114 in contact with the sleeve 108 (Fig. 8). It will be seen that the ejector finger 111 is free to yield downwardly to allow a bobbin discharged from the magazine to pass by said finger and assume a position ready for donning, but if desired said finger may be withdrawn from the path of the entering bobbin by suitable means such as a shoulder 115 arranged to be struck by the finger as the latter nears the end of its upward or restoring movement and thus cause said finger to fold downwardly alongside the sleeve 108 and out of the way of the descending bobbin.

116 is a guard fixed to the sleeve 108 in position to travel up and down in the slot 99, said guard serving to prevent the upper portion of a bobbin from casually leaving the tube through the slot. The ejector finger 111 may be vertically reciprocated at proper times by suitable means such as a link 117 (Fig 2ª) connecting the sleeve 108 to a portion 118 fixed to and reciprocating with the doffing tube 51.

The bobbin-seater 53 (Figs. 2ª and 13) is fixed to the lower end of a rod 119 which is slidable in bearings on the brackets 92 93. A spline 120 fitting within a groove in the rod 119 prevents the latter from turning.

121 is a projection on the bobbin-seater arranged to be engaged by one end of the channel bar 65. A coiled spring 122 bearing at its ends against the bracket 92 and a pin 123 in the rod 119 tends to move said rod and the bobbin-seater downward. When the crank pin 64, working in the channel bar 65, moves the doffing tube downward, the spring 122 drives the bobbin-seater 53 against the tip of a bobbin theretofore discharged from the donning tube, and causes said bobbin to be frictionally engaged with its spindle. As the doffing tube rises, the channel bar 65 strikes the projection 121 and lifts the bobbin-seater against the tension of the spring 122.

The empty bobbins with which the full bobbins are to be replaced are contained in a circular or disk-like magazine 124. That form of magazine which has been selected for illustration comprises a ring portion 125 and an outwardly extending annular central flange 126. As shown in Figs. 3 and 14, the bobbins extend through openings 127 in the ring portion 125 with their tips projecting inwardly from said ring portion and with their butts lying at opposite sides of the flange 126. In this instance the magazine is adapted to contain two annular rows of bobbins, but it will be understood that it may be modified to contain a greater number of rows. The bobbins are releasably held in the magazine by suitable means such as ring-shaped springs 128 (Figs. 17 and 19) each lying within a recess 129 the opposite sides of which recess communicate with the two adjacent openings 127 so that one spring device 128 serves to frictionally hold two bobbins in place.

The magazine is supported in such a manner that it may be rotated to bring the bobbins to the lower side of the magazine and into a vertical plane extending from front to rear of the doffer through the axis of the donning tube 52, and so that the magazine may be swung on a horizontal axis coinciding substantially with its diameter to bring bobbins of the two rows into alinement with the donning tube. In the present embodiment the magazine-supporting means comprises two grooved rollers 129 130 each mounted in a fork 131, the stems of said forks being mounted in horizontal bearings at the ends of the bracket member 18. These rollers engage the periphery 132 of flange 126 of the magazine, and receive between their flanges an annular rim 133 formed on the flange 126. The magazine-supporting means, in this instance, further comprises two rollers 134 135 arranged below the magazine. The roller 135 is fixed upon a short shaft 136 (Fig. 16) which is rotatable and longitudinally slidable in bearings 137 on a bracket 138 fixed to the tubes 15. The roller 134 (Fig. 11) is provided with a hub or sleeve 139 which has a spline connection with a shaft 140 mounted in bearings in the bracket 138.

Means is provided for reciprocating the roller 134 upon its shaft 140 to swing the magazine to bring the two rows of bobbins into register with the donning tube, which means, in the present embodiment, comprises a bell-crank lever 141 supported on a bracket 141ᵃ on one of the tubes 15, one arm of which lever is bifurcated and provided with studs 142 (Fig. 16) which lie in an annular groove 143 in the sleeve 139. The other arm of the bell-crank lever 141 carries a stud engaging a cam 144 fixed upon the shaft 39.

The means herein shown for rotating the magazine comprises intermeshing spiral gears 145 fixed upon the shafts 39 and 140, and further comprises a driving connection between the roller 134 and the magazine. The shaft 140 is arranged in this instance to rotate continuously, one rotation of the shaft 140 occurring in every two revolutions of the crank 44. The connection between the roller 134 and the magazine is such that the magazine is rotated intermittently. Herein I have shown the rim 133 as having a series of notches 146 (Fig. 17) to receive a projection 147 on the roller 134, the rim being made concave as at 148 between the notches 146 to conform to the curvature of the bottom 149 of the groove of said roller. At opposite sides of the projection 147 the bottom of said groove is cut away to afford clearance for the points 150. As the roller 134 is rotated the projection 147 enters a recess 146 and turns the magazine until said projection leaves the recess, after which the magazine is held from rotation by the contact of the concave surface 148 with the convex bottom 149 of the groove in the roller 134. Thus the magazine is rotated step by step and is held against rotation during the intervals between successive steps.

The bobbins may be discharged from the magazine by any suitable means, as, for example, a hammer 151 (Fig. 15) pivoted at 152 upon the bracket 18, said hammer being arranged to strike the tips of the bobbins successively to force the bobbins singly from the magazine. The means herein shown for giving the hammer its driving movement consists of a spring 153, while the means for restoring the hammer and holding it from action until the proper moment consists of a disk 154 having two cam portions 155 therein, said disk being fixed on the shaft 39 and operating on a stud 156 on the side of the hammer 151.

It will be apparent from Fig. 3 that in the present embodiment the axis ($x$) of swinging movement of the magazine intersects its axis ($y$) of rotation. It will also be understood from Figs. 1, 3 and 14 that the axes of all of the bobbins have a common point of intersection coinciding with the point of intersection of the axes $x$ and $y$. The magazine is herein shown as supported so that its axis of swinging movement is in the vertical plane of the series of spindles on the spinning frame. The rotative and swinging movements of the magazine thus bring each bobbin successively into the range of the hammer 151 and into vertical alinement with the donning tube 52 when said tube is moved by the cam 62 into receiving position.

157 and 158 are handles fixed to the tubes 15 and adapted for use in moving the doffer about and placing it in operative relation to the spinning frame.

When the bobbins upon a spinning frame are ready to be doffed, the ring rail $e$ is stopped in its lowermost position, and a few turns of yarn are spun around the lower ends of the bobbins. The spinning frame is then stopped, and the thread-board $g$ thrown back. When the crank 44 is in its locked position, the doffing tube 51 is elevated and ready to descend, the ejector-finger 111 is ready to move downward, and the magazine-supporting rollers 134 135 are in their rearward position. The parts being in these positions, a magazine 124 is placed upon the doffer, and the latter placed in operative relation to the spinning frame at the left-hand end thereof. The crank having been unlocked, it is rotated to actuate the doffer mechanisms and to feed the doffer to the right along the spinning frame. The diffing, donning and bobbin-seating devices go through one cycle of operations in each revolution of the crank. Upon commencing the first revolution of the crank 44, the doffing tube 51 descends upon a filled bobbin, the ejector-finger 111 makes an idle downward movement (it being assumed that the donning tube 52 is empty), the hammer 151 rises, and the magazine is swung forward after the hammer rises. During the remainder of the first revolution of the crank, the doffing tube 51 rises with a filled bobbin, the hammer drives a bobbin into the tube 52, the ejector-finger 111 rises, and the sliding framework 54 makes a quick horizontal movement to the right to position the tube 51 over the next full bobbin and the tube 52 over the spindle from which a bobbin was lifted. In the next revolution of the driving crank 44 the magazine is rotated through one step and swung to carry its lower portion rearward. In the following revolution of the crank, the magazine is swung in the opposite direction, and so on, the magazine being given a partial rotation during alternate cycles of operation of the doffing tube, donning tube and bobbin-seater, but being swung during each such cycle to bring bobbins of the two rows in the magazine alternately beneath the hammer 151 and above the donning tube.

I claim as my invention:

1. A bobbin magazine for doffers comprising a structure having an annular series of spaces therein to receive bobbins, the bobbins being arranged to escape endwise from said spaces, and a plurality of separate springs extending into position to constantly engage the sides of the bobbins inserted into said spaces for frictionally holding the bobbins against endwise movement in said spaces.

2. A bobbin magazine for doffers comprising an annular structure having a peripheral flange, said annular structure having bobbin-receiving spaces therein at opposite sides of said flange.

3. A bobbin magazine for doffers comprising an annular structure having a peripheral flange, said annular structure having a row of approximately radial bobbin-receiving spaces at each side of said flange.

4. A bobbin magazine for doffers, comprising a rotatable structure having means for supporting bobbins extending approximately radially of the structure, said structure having an open central space extending from side to side of the structure and affording unobstructed access to the interior of the structure.

5. A bobbin magazine for doffers comprising an annular portion having a plurality of rows of bobbin-receiving openings thereon, the width of said annular portion being such that the tips of the bobbins extend beyond the inner periphery of said portion and the butts beyond the outer periphery thereof, and spring means carried by said annular portion and arranged to frictionally engage bobbins for releasably holding bobbins in said openings.

6. A doffer having a disk-like bobbin magazine, means for supporting said magazine upon its edge, and means for rotating said magazine.

7. A doffer having a bobbin magazine, means for supporting said magazine for rotational and transverse swinging movements, and means for swinging and rotating said magazine.

8. A doffer having a bobbin magazine, means for supporting said magazine for rotational and transverse swinging movements, and means for swinging and rotating said magazine, said magazine having means for supporting bobbins with their axes approximately extending through the point of intersection of the axis of swinging movement and the axis of rotation.

9. A doffer for spinning frames having a bobbin magazine, and means for supporting said magazine for rotation upon a substantially horizontal axis, said supporting means being positioned at the periphery of the magazine.

10. A doffer for spinning frames, having a bobbin magazine, and means for supporting the magazine for transverse swinging movement upon a horizontal axis located in the vertical plane of the series of spindles on the spinning frame.

11. A doffer for spinning frames, having a bobbin magazine, and means for supporting said magazine for rotational and transverse swinging movements with the point of intersection of the axis of swinging movement and the axis of rotation in the vertical plane of the series of spindles on the spinning frame.

12. A doffer comprising a supporting frame, rollers mounted on said frame, and a bobbin magazine peripherally resting upon certain of said rollers.

13. A doffer comprising a supporting frame, a plurality of rotatable elements mounted on said frame, and a round bobbin-magazine rotatably supported between certain of said elements and resting upon another of said elements.

14. A doffer comprising a supporting frame, a plurality of rotatable elements mounted on said frame, and a disk-like bobbin-magazine rotatably supported between certain of said rotatable elements and resting upon another of said elements, said magazine and elements having a flange and groove connection.

15. A doffer comprising a supporting frame, rotatable elements mounted on said frame, a bobbin magazine rotatably supported by said elements, one of said elements having a driving connection with the magazine, and means for rotating that element.

16. A doffer comprising a supporting frame, a bobbin magazine rotatably supported in said frame, said magazine having a flange theron, and a rotary element mounted in the supporting frame and having a driving engagement with said flange.

17. A doffer for spinning frames comprising a supporting frame, a disk-like bobbin-magazine rotatably supported in said frame in substantially the vertical plane of the series of spindles, and means for rotating the magazine.

18. A doffer for spinning frames comprising a supporting frame, two rollers mounted in said frame to rock upon a horizontal axis extending longitudinally of the spinning frame, a roller mounted in said frame for sliding movement in a direction transverse to the spinning frame, a round magazine carried by the first mentioned rollers and upon the last mentioned roller, and means for sliding and rotating the last mentioned roller.

19. A doffer having a rotatably-supported bobbin magazine, means for rotating said magazine, and means operating within the magazine for successively discharging individual bobbins therefrom.

20. In a doffer, a supporting frame, a bobbin-magazine rotatably supported in the frame, said magazine being adapted to support bobbins with their tips extending inwardly, a hammer mounted in the supporting frame in position to strike the tips of the bobbins, means for actuating the hammer, and means for rotating the magazine to bring bobbins into operative relation to the hammer.

21. In a doffer, in combination. a tube adapted to receive an empty bobbin, a magazine rotatably supported above said tube, means for rotating the magazine to bring bobbins into operative relation to the tube, and means for forcing the bobbins singly from said magazine into said tube.

22. In a doffer, in combination, a tube adapted to receive an empty bobbin, a magazine adapted to contain a plurality of annular rows of bobbins, means for supporting said magazine for rotation and swinging movement above said tube, means for swinging said magazine to bring the various rows of bobbins into operative relation to the tube, means for rotating the magazine to bring successive bobbins into operative relation to the tube, and means for releasing single bobbins from the magazine.

23. In a doffer, in combination, a bobbin magazine adapted to contain a plurality of rows of bobbins, means for supporting said magazine for rotational and swinging movements upon substantially horizontal axes, donning means, means for rotating the magazine, and means for shifting the magazine back and forth to bring the various rows of bobbins into operative relation to the donning means.

24. In a doffer, in combination, a circular bobbin magazine adapted to contain a plurality of annular rows of bobbins, means for supporting said magazine for rotation upon a horizontal axis and for swinging movement upon a horizontal axis at approximately right angles to the rotational axis, a single vertical donning tube, and means for rotating the magazine and for swinging the same back and forth to bring single bobbins in the various rows successively into alinement with the upper end of said donning tube.

25. A bobbin magazine for doffers comprising a structure having bobbin-receiving openings therein, and a recess formed between every two adjacent openings, said recess communicating with said adjacent openings, and means in said recess adapted to engage bobbins in said adjacent openings.

26. A doffer having an annular disk-like magazine, the latter having approximately radial bobbin-receiving spaces therein, and means positioned within the central space of the magazine adapted to engage the ends of successive bobbins for forcing the bobbins from the magazine.

27. A doffer having a bobbin magazine comprising an annular structure providing an open central space, and bobbin ejecting means positioned within said space.

28. A doffer having an annular bobbin magazine, said magazine having approximately radial bobbin-receiving spaces therein, and means positioned within the space at the center of the magazine and adapted to engage the ends of the bobbins for ejecting them from the magazine.

29. A doffer having an annular bobbin magazine, and means positioned within the magazine and adapted to successively engage bobbins for discharging them singly from the magazine.

30. A doffer having an annular magazine adapted to contain a plurality of rows of bobbins with all of their axes intersecting adjacent the central portion of the magazine, means positioned within the magazine for ejecting bobbins from the magazine, means for rotating the magazine, and means for swinging the magazine to bring bobbins in various rows into operative relation to said ejecting means.

31. A doffing machine having a circular magazine provided with recesses to contain a plurality of annular rows of bobbins, means for ejecting bobbins from said magazine, and mechanism for rotating the magazine and for moving the same transversely of said rows of bobbins whereby to move the bobbins into position to be acted upon by said ejecting means.

32. A doffer for spinning frames comprising a tube adapted to guide empty bobbins onto the spindles of the spinning frame, a magazine rotatably mounted above said tube and having a plurality of approximately radial bobbin-receiving spaces therein, and means arranged to successively engage the ends of the bobbins and eject them endwise from said magazine into said tube, said magazine being rotatable to carry the respective bobbins into operative relation to said ejecting means and said tube.

33. A doffing machine for spinning frames comprising a guide tube to direct bobbins onto the spindles of the spinning frame, a bobbin magazine mounted above said guide tube and having recesses adapted to contain a plurality of annular rows of bobbins, means for rotating the magazine in a direction approximately parallel to the spindles on the spinning frame, and means for moving the magazine transversely of the row of spindles whereby the bobbins in the magazine will be singly and successively placed in position to be discharged into said guide tube.

34. A doffer for spinning frames comprising guide means to direct bobbins onto the spindles of the spinning frame, a bobbin magazine having a plurality of rows of bobbins therein, means for moving the magazine in the direction of the rows of bobbins to present successive bobbins in operative relation to said guide means, and means for moving the magazine transversely of the rows of bobbins to position the different rows in operative relation to said guide means.

35. A doffing machine having a vertical guide tube, a bobbin magazine arranged to move the bobbins therein into vertical position above said tube, and a spring-pressed hammer arranged to engage the upper ends of the bobbins for discharging them singly and successively into said guide tube.

36. A doffer having vertical guide means for bobbins, a movably mounted bobbin magazine arranged to carry the bobbins therein in vertical position above said guide means, an ejector arranged to engage the upper ends of the bobbins to push them from the magazine into said guide means, a spring tending to move said ejector downwardly, and a cam arranged to raise the ejector and to permit sudden descent thereof.

37. A doffing machine provided with a bobbin guide tube having a longitudinal slot therein, a finger arranged to project into said tube and to reciprocate in said slot for engaging bobbins in the tube, said finger normally tending to project into the tube, and means for withdrawing said finger from the tube at times.

38. A doffing machine provided with a bobbin guide tube having a longitudinal slot therein, a member positioned outside of the tube and arranged to be reciprocated longitudinally of the tube, a dog pivoted on said member and arranged to extend through said slot into the tube to engage bobbins therein, said dog normally tending to project into the tube, and means for withdrawing said dog from the tube when said member reaches one end of its reciprocatory movement.

39. A doffing machine provided with a bobbin guide tube having a longitudinal slot therein, a member mounted adjacent to said slot for reciprocation longitudinally thereof, a dog pivoted on said member and arranged to project into said slot and engage bobbins in said tube, a coiled spring tending to swing said dog into said tube, and a stationary shoulder arranged to engage the dog and withdraw it from said tube at the upper limit of movement of the dog.

40. A doffing machine provided with a donning tube having a longitudinal slot therein, means at the lower end of said tube arranged to yieldingly engage a bobbin to prevent its escape from the tube, a member arranged for reciprocation adjacent to and longitudinally of said tube, an ejector dog pivoted on said member and arranged to project through said slot and engage a bobbin to force it past said yielding means, a spring tending to swing said dog upwardly into said tube, and a shoulder adjacent to the upper end of said tube against which the dog is moved near the upper end of movement of said reciprocatory member, said shoulder acting to swing said dog downwardly and withdraw it from the tube.

41. A doffing machine provided with a donning tube having a longitudinal slot therein, an ejector finger arranged to travel longitudinally of the slot, and means moving with said finger for closing said slot to prevent the casual escape of the bobbins.

42. A doffing machine provided with a donning tube having a longitudinal slot therein, and a guard reciprocating longitudinally in said slot and acting to prevent the casual escape of the bobbins through the slot.

43. A doffing machine provided with a bobbin guide tube having a longitudinal slot therein, a finger arranged to project into said tube and to reciprocate in said slot for engaging bobbins in the tube, said finger normally tending to project into the tube, and means for withdrawing said finger from the tube at times.

44. A doffing machine provided with a bobbin guide tube having a longitudinal slot therein, a member positioned outside of the tube and arranged to be reciprocated longitudinally of the tube, a dog pivoted on said member and arranged to extend through said slot into the tube to engage bobbins therein, said dog normally tending to project into the tube, and means for withdrawing said dog from the tube when said member reaches one end of its reciprocatory movement.

45. A doffing machine provided with a bobbin guide tube having a longitudinal slot therein, a member mounted adjacent to said slot for reciprocation longitudinally thereof, a dog pivoted on said member and arranged to project into said slot and engage bobbins in said tube, a coiled spring tending to swing said dog into said tube, and a stationary shoulder arranged to engage the dog and withdraw it from said tube at the upper limit of movement of the dog.

46. A doffing machine provided with a donning tube having a longitudinal slot therein, means at the lower end of said tube arranged to yieldingly engage a bobbin to prevent its escape from the tube, a member arranged for reciprocation adjacent to and longitudinally of said tube, an ejector dog pivoted on said member and arranged to project through said slot and engage a bobbin to force it past said yielding means, a spring tending to swing said dog upwardly into said tube, and a shoulder adjacent to the upper end of said tube against which the dog is moved near the upper end of movement of said reciprocatory member, said shoulder acting to swing said dog downwardly and withdraw it from the tube.

47. A doffing machine provided with a donning tube having a longitudinal slot therein, an ejector finger arranged to travel longitudinally of the slot, and means moving with said finger for closing said slot to prevent the casual escape of the bobbins.

48. A doffing machine provided with a donning tube having a longitudinal slot therein, and a guard reciprocating longitudinally in said slot and acting to prevent the casual escape of the bobbins through the slot.

In testimony whereof I affix my signature in presence of two witnesses.

BURT A. PETERSON.

Witnesses:
  J. F. Elwood,
  Louise A. Culver.

Copies of this patent may be obtained for five cents each, by addressing the "Commissioner of Patents, Washington, D. C."